April 30, 1968
R. H. JORDAN ET AL
3,380,753
SWITCH CONSTRUCTION FOR USE IN TURN SIGNAL
INDICATOR IN MOTOR VEHICLES
Filed June 26, 1964
2 Sheets-Sheet 1
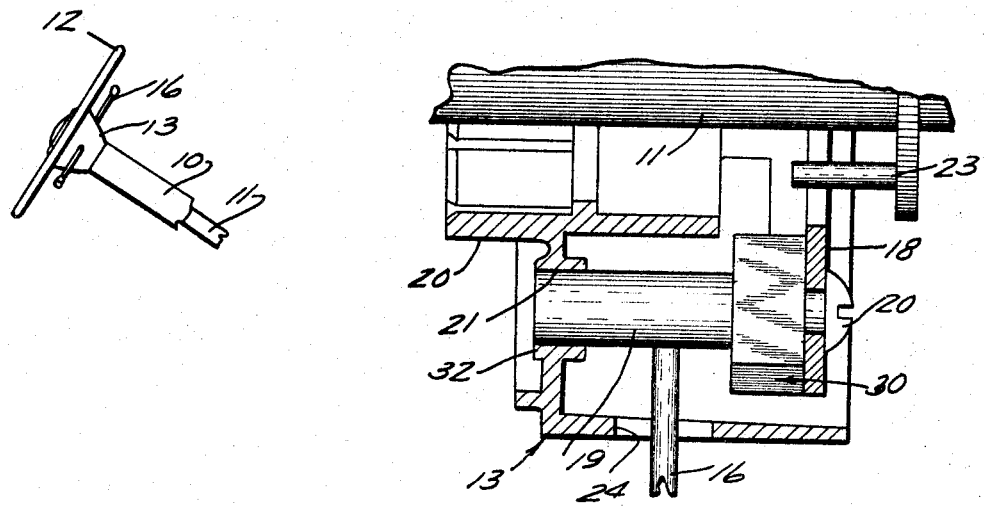
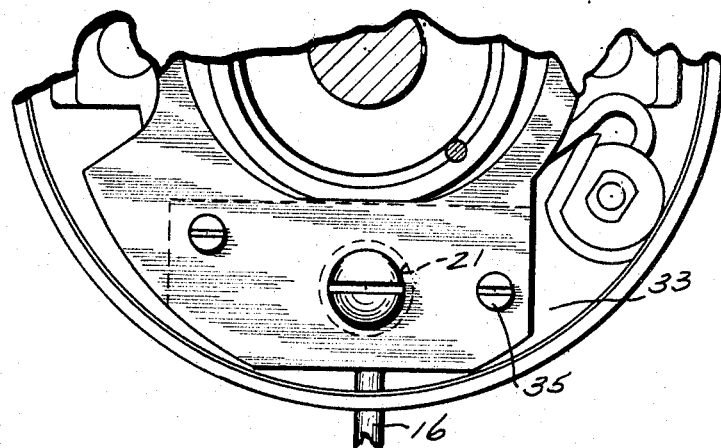
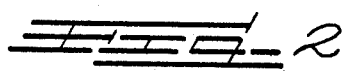
INVENTOR.
Richard H. Jordan
Samuel A. Findley
BY *[signature]* ATTORNEYS

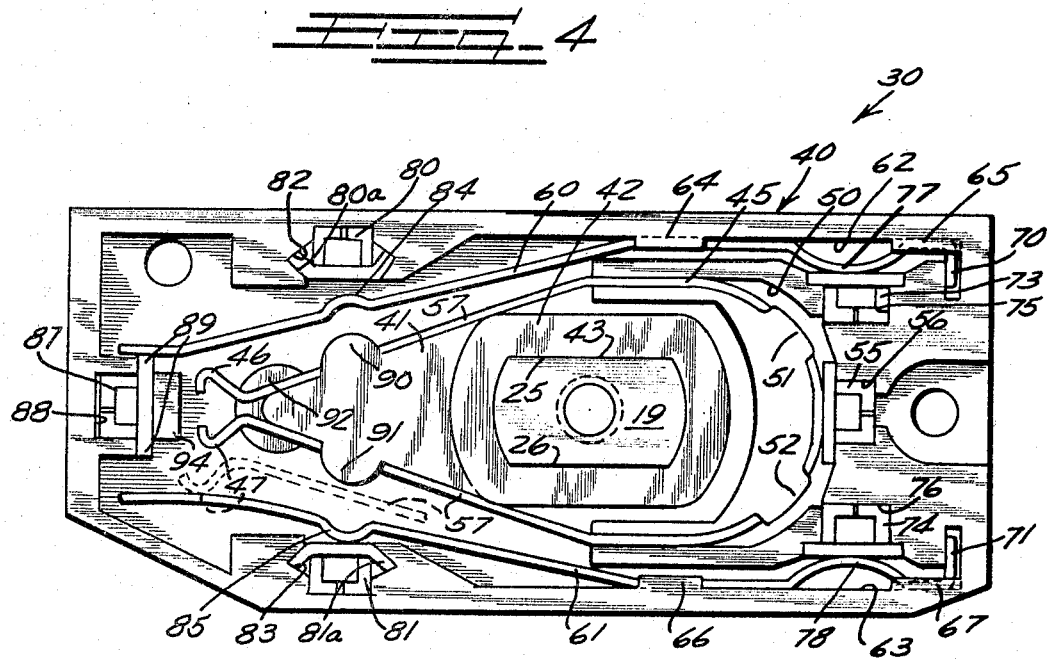
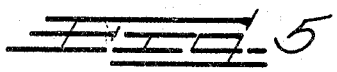
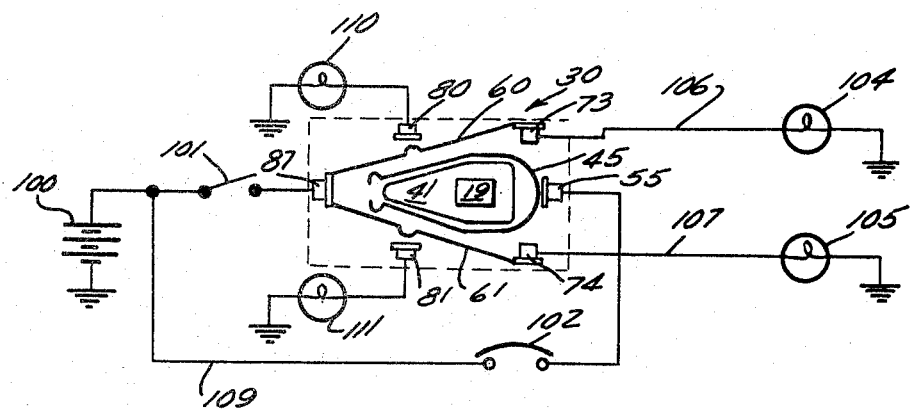

United States Patent Office 3,380,753
Patented Apr. 30, 1968

3,380,753
SWITCH CONSTRUCTION FOR USE IN TURN SIGNAL INDICATOR IN MOTOR VEHICLES
Richard H. Jordan, Fort Myers, Fla., and Samuel A. Findley, Bronson, Mich., assignors to Kingston Products Corporation, Kokomo, Ind., a corporation of Indiana
Filed June 26, 1964, Ser. No. 378,180
5 Claims. (Cl. 200—61.27)

ABSTRACT OF THE DISCLOSURE

A bidirectional electrical switch for use in turn direction indicators for motor vehicles. The switch includes a rectangular body having a plurality of recessed portions with a small hole therein and through the switch body for receiving a wire conductor. A cam actuator extends through the body and engages an angularly shiftable cam member positioned within the interior of the body to engage certain ones of a set of switches formed within the body.

This invention relates to a switch construction and particularly to a bidirectional switch assembly adapted for use in turn direction indicators for motor vehicles.

It is an object of this invention to provide a switch capable of assembly in a minimum time at a minimum cost consistent with the durability of and effectiveness of the product.

It is a further object of this invention to provide a switch assembly which can be assembled quickly and accurately without the use of special tools or techniques.

Another object of this invention is to provide a bidirectional switch for turn direction indicators and the like having a minimum number of parts while maintaining the ability to control a plurality of functions.

Still another object of this invention is to provide a switch which is highly reliable.

A further object of this invention is to provide a switch which while having a minimum number of parts is easily actuated.

Although the switch described herein has many uses, it has special advantages when used in conjunction with a turn direction indicator system in motor vehicles.

This invention contemplates other objects, features and advantages which will become more fully apparent from the following detailed description taken in conjunction with the accompanying drawings.

On the drawings:

FIG. 1 is a diagrammatic view of the portion of the steering column of an automotive vehicle which is adjacent the steering wheel and showing the location of the turn direction indicator lever with which a switch in accordance with the present invention may be associated;

FIG. 2 is a partial elevational view of the turn indicator mechanism with certain parts broken away and with other parts shown in section;

FIG. 3 is a partial longitudinal sectional view showing a portion of the turn indicator;

FIG. 4 is an enlarged side elevational view showing the details of the switch associated with the turn indicator and constructed in accordance with this invention; and FIG. 5 is a schematic wiring diagram showing the connections of the switch of FIG. 4 in a circuit for controlling a plurality of indicating lamps.

As shown on the drawings:

In the embodiment of the invention illustrated in the drawings, there is diagrammatically shown in FIG. 1 a steering column 10 encasing a steering post 11 having a steering wheel 12 at the upper end thereof. The steering column 10 has an enlarged upper housing portion 13, just beneath the steering wheel 12 and carrying a turn indicator having an indicator lever 16 extending generally radially to the housing portion 13 and normally in a neutral position, but movable to one side or the other of the neutral position to effect the lighting of signal lamps indicating the intention of the operator of the vehicle to make a right or left-hand turn.

Shown in FIGS. 2 and 3 is a cam plate 18 which is secured to a shaft 19 by means of a screw 20. The other end of the shaft 19 is inserted into an aperture 21 for radial movement therein. The indicator lever 16 passes through an opening 24 in the housing portion 13 and is secured to the shaft 19 by some suitable means. Also on the shaft 19 are two flat portions 25 and 26 which pass through a switch 30 to effect the operation thereof when the indicator lever 16 is actuated. The switch 30 is fixedly mounted to a pair of support members 32 and 33 by a pair of screws 34 and 35. The support members 32 and 33 are connected to and form a part of the housing portion 13.

When the indicator lever 16 is actuated in either direction the shaft 19 will rotate about its axis in the aperture 21, causing the cam plate 18 to engage operating means to hold the indicating lever in actuated position. Also, when the shaft 19 has rotated, the flat portions 25 and 26 will have changed their relative position in the switch 30 to effectively actuate the switch 30.

Shown in FIG. 4 is the switch 30 which has a rectangular body 40 in which an actuating cam 41 is located. The cam 41 has a central portion 42 having a rectangular opening 43 therethrough, and the flat portions 25 and 26 of the shaft 19 can then engage the opening 43 to actuate the switch as mentioned above. A substantially U-shaped contactor 45 has a bight portion which corresponds in configuration to the channel 50. At the free ends of the contactor 45, there is formed rounded end portions 46 and 47 which each extend outwardly and are then reversely offset inwardly. A pair of flanges 51 and 52 partially cover the channel 50 approximately the width of the bight portion of the contactor 45. An end terminal 55, which can be connected to the end of a copper conductor, is inserted into a recess portion 56 to effectively apply pressure against the bight portion of the contactor 45 thereby maintaining it under the flanges 51 and 52. Connected to the rounded end portions 46 and 47 of the contactor 45 are elongated legs 57 and 58 which effectively resiliently engage opposite sides of the cam 41.

A pair of elongated contactors 60 and 61 are inserted into corresponding channels 62 and 63, spaced outwardly of the legs 57 and 58, and are partially covered by flanges 64–65 and flanges 66–67 respectively. The contactors 60 and 61 are prevented from moving longitudinally by the offset lug portions 70 and 71 which engage corresponding recesses extending at right angles from the channels 62 and 63. A pair of end terminals 73 and 74 are then inserted into a pair of recess portions 75 and 76 and make contact with curved portions 77 and 78 of the contactors 60 and 61 respectively, and serve to prevent transverse motion of the portion of the contactors 60 and 61 which is engaged in the channels 62 and 63.

A pair of end terminals 80 and 81, which are inserted into a pair of recess portions 82 and 83, make contact with curved contact portions 84 and 85 offset along an intermediate portion of each respective contactor 60 and 61 when the contactor 45 is actuated by the cam 41 and moves from the full line position of FIG. 4 to the dotted line position. An end terminal 87, located in a recess portion 88, has alignment guides 89 which make contact with the contactors 60 and 61 to effectively connect end terminals 73 and 74 thereto. When the cam 41 is actuated in one direction, the curved portion 46 of the contactor 45 will engage the contactor 60 and connect the curved contact portion 84 thereof to the end terminal 80. In a similar manner, when the cam 41 is actuated in an opposite direction, the curved portion 47 of the contactor 45 will engage the contactor 61 and connect the curved contact portion 85 thereof to the end terminal 81. A pair of cam stops or retainers 90 and 91 are located on the cam 41 and serve to prevent excessive actuating pressure and over-travel of the contactors 45, 60 and 61 by engaging the end terminals 80 and 81 when the cam 41 is actuated, while a rounded cam guide or retainers 92 located at the forward bottom portion of the cam 41 serves to contain the resilient portions 57 and 58 in an operable position.

The switch 30 can be completely and easily assembled in a simple manner. The contactor 45 is first placed into the channel 50 and then held into place under the flanges 51 and 52 by insertion of the end terminal 55. The cam 41 is then inserted between the resilient portions 57 and 58 for actuation thereof. In a similar manner, the contactors 60 and 61 are inserted into the channels 62 and 63 and thereafter held into position under the flanges 64–65 and 66–67 by insertion of the end terminals 73 and 74. The end terminals 80 and 81 are fixed by alignment ears 80a and 81a which engage corresponding areas of the recessed portions 82 and 83 and the end terminal is fixed in the recess portion 88 by a boss member 94 of the rectangular body 40.

FIG. 5 shows a simplified circuit diagram of a turning indicator system used in motor vehicles. The switch 30, as indicated by the dotted line, is used to selectively supply power from a battery 100. A brake switch 101 has one end thereof connected to the battery 100 and to a circuit breaker device 102„ and the other end thereof is connected to the end terminal 87 of the switch 30. When the brakes of the motor vehicle are applied, the brake switch 101 will actuate and apply power to a pair of rear lamps 104 and 105 through the end terminal 87, contactors 60 and 61, end terminals 73 and 74 and a pair of conductors 106 and 107 respectively. A pair of forward indicating lamps 110 and 111 are connected to the end terminals 80 and 81 to be energized when the indicating lever 16 is actuated in either direction.

When the brake switch 101 is not actuated, and the cam 41 is actuated in the upward direction, the contactor 45 will engage the contactor 60 to cause the contactor 60 to engage the end terminal 80 thereby applying power to both indicating lamps 104 and 110, which are on the same side of the motor vehicle. It is noticed that when the cam 41 is in this position the contactor 60 is no longer engaging the end terminal 87. Similarly, when the cam 41 is actuated in a downward direction, the contactor 45 will engage the contactor 61 to cause the contactor 61 to come in contact with the end terminal 81 thereby applying power to both indicating lamps 105 and 111. During either of the above mentioned actuated conditions, the circuit breaker device 102 will repetitively open and close the circuit to cause a flashing effect by the indicator lamps. When the brake switch 101 is actuated at the same time the cam 41 is actuated, the contactor 60 or the contactor 61 will disconnect the lamp 104 or the lamp 105 thereby applying an indication of braking to only one of the rear lamps, while the other of the rear lamps and the forward lamp will indicate the direction the motor vehicle is going to turn.

It will be understood that we wish to embody within the scope of the patent warranted hereon all such modifications as reasonably and properly come within the scope of our contribution to the art.

We claim as our invention:

1. A switch comprising:
   (a) a hollow body member having an opening in one end thereof,
   (b) a cam actuator extending through said opening,
   (c) an angularly shiftable cam member in the interior of said body having a lobe portion and having means to receive said cam actuator.
   (d) said body having formed therein side walls spaced outwardly of said cam member on opposite sides thereof and an end wall spaced outwardly of said cam member perpendicular to the lobe of said cam member,
   (e) a first channel formed in said body between said cam member and said side walls and one of said end walls,
   (f) a second channel formed in said body between said first channel and one of said side walls,
   (g) a third channel formed in said body between said first channel and the other of said side walls,
   (h) flange means over said first and said second and said third channels,
   (i) a first contactor comprising an elongated member made of electrically conductive material and being shaped to form a bight portion received in said first channel under said first flange means and having elongated movable legs extending on opposite sides of said cam for engaged actuation thereby,
   (j) a second contactor comprising an elongated member made of electrically conductive material and being shaped to form a bent portion received in said second channel under said second flange means and having an elongated movable leg extending between said side wall and one of said legs of said first contactor,
   (k) a third contactor comprising an elongated member made of electrically conductive material and being shaped to form a bent portion received in said third channel under said third flange means and having an elongated movable leg extending between said side wall and one of said legs of said first contactor,
   (l) flange means extending over said first, said second and said third channels for retaining said first, said second and said third contactors,
   (m) a terminal in said body engaged with the bight portion of said first contactor for urging said first contactor under said first flange means and for connection to an electrical wire,
   (n) a terminal in said body engaged with the bent portion of said second contactor for urging said second contactor under said second flange means and for connection to an electrical wire,
   (o) a terminal in said body engaged with the bent portion of said third contactor for urging said third contactor under said third flange means and for connection to an electrical wire,
   (p) contact means in each of said side walls for making contact with the arcuate portion of said legs of said second and said third contactor when said cam member is rotated toward the respective contact means, and
   (q) contact means in the other of said end walls for making contact with the end of said legs of said second and said third contactor when said cam member is in a neutral position and for connection to an electrical wire.

2. A switch comprising:
   (a) a hollow body member having an opening in one end thereof,
   (b) a cam actuator extending through said opening,
   (c) an angularly shiftable cam member in the interior of said body having a lobe portion and having means to receive said cam actuator,
   (d) said cam member having opposed flange portions extending over and perpendicular with the face of the lobe of said cam member for limiting the angular travel of said cam member,
   (e) a first channel formed in said body between said cam member and said side walls and one of said end walls, (f) a second channel formed in said body between said first channel and one of said side walls, (g) a third channel formed in said body between said first channel and the other of said side walls, (h) flange means over said first and said second and said third channels, (i) a first contactor comprising an elongated member made of electrically conductive material and being shaped to form a bight portion received in said first channel under said first flange means and having elongated movable legs extending on opposite sides of the lobe and between said opposed flange portions on said cam member, (j) a terminal in said body engaged with the bight portion of said second contactor for connection to an electrical wire, (k) a third contactor comprising an elongated member made of electrically conductive material and being shaped to form a bent portion received in said third channel under said third flange means and having an elongated movable leg extending between said wall and one of said legs of said first contactor, (l) flange means extending over said first, said second and said third channels for retaining said first, said second and said third contactors, (m) a terminal in said body engaged with the bight portion of said first contactor for urging said first contactor under said first flange means and for connection to an electrical wire, (n) an arcuate portion on said leg of said second and said third contactor to form a contact surface, (o) a terminal in said body for engagement with the bight portion of said first contactor and for connection to an electrical wire, (p) a terminal in said body for engagement with the bent portion of said second contactor and for connection to an electrical wire, (q) a terminal in said body for engagement with the bent portion of said third contactor and for connection to an electrical wire, (r) contact means in each of said side walls for making contact with the arcuate portion of said legs of said second contactor when said cam member is rotated toward the respective contact mean, (s) and contact means in the other of said end walls for making contact with the end of said legs of said second contactor when said cam member is in a neutral position and for connection to an electrical wire.

3. A switch comprising:

(a) a hollow body member having five closed sides and an open side and having an access in the closed side opposite the open side, (b) a cam actuator extending through said access, (c) an angularly shiftable cam member in the interior of said body having a lobe portion and having means to receive said cam actuator, (d) said body having formed therein side walls and end walls spaced outwardly of said cam member on opposite sides thereof and including means forming a first channel between said cam member and said side walls and one of said end walls and further including means forming a second channel between said first channel and said side walls and said one of said end walls, (e) a first contactor comprising an elongated member made of electrically conductive material and being shaped to form a bight portion received in said first channel and having elongated movable legs extending on opposite sides of said cam for engaged actuation thereby, (f) said legs of said first contactor having an end which first turns outwardly and then turns inwardly to form a contact surface, (g) a terminal inserted into said body through the open side thereof for engagement with the bight portion of said first contactor, (h) a second contactor comprising an elongated member made of electrically conductive material and being shaped to form a bight portion received in said second channel and having elongated movable legs extending between said side walls and said legs of said first contactor for engaged actuation thereby, (i) said legs of said second contactor having an arcuate portion to form a contact surface, (j) a terminal inserted into said body through the open side thereof, for engagement with the bight portion of said second contactor, (k) contact means inserted into said body at each of said side walls through the open side thereof for making contact with the arcuate portion of said legs of said second contactor when said cam member is rotated toward the respective contact means, whereby electrical contact will be made between said first contactor and said second contactor and one of said contact means, (l) contact means inserted into said body through the open side thereof for making contact with the end of said legs of said second contactor when said cam member is in a neutral position, and flange means extending over said first and second channels to maintain said conductors in their respective channels.

4. A switch comprising:

an enclosure;

inner and outer U-shaped contact members positioned within said enclosure and having spaced apart generally parallel legs;

camming means positioned within said enclosure internally of the innermost of said contact members and engageable with the legs thereof to move the legs outwardly;

first retainer means formed on said camming means and extending beyond said inner U-shaped contact member; and second retainer means formed on said camming means and extending beyond said inner U-shaped contact member and facing in a direction opposite to that of said first retainer means to confine said inner contact member between said first and second retainer means;

said second retainer means extending beyond said inner U-shaped contact member sufficient to become engageable with said enclosure when the cam is rotated through a predetermined angle, thereby preventing over-stressing of said contact members.

5. A switch comprising:

a rectangular body;

a plurality of channels formed in said body;

resilient contactors positioned within the channels;

flanges formed as an integral part of said body and extending over said channels to confine the resilient contactors in position within said channels;

a cam actuator extending through a wall of said body and terminating within said body;

a cam connected to said actuator for movement therewith;

a U-shaped contactor positioned about said cam and selectably engageable with said resilient contactors in said channels;

retainer means formed on said cam and extending beyond said U-shaped contactor engaged therewith; and stop means formed on said cam and extending beyond said U-shaped contactor to confine said U-shaped contactor between said retainer means and said stop means to maintain the U-shaped contactor in an operable position about said cam;

said stop means engageable with the interior of said rectangular body to prevent over-travel of said resilient contactors.

References Cited

UNITED STATES PATENTS

| | | | |
|---|---|---|---|
| 2,808,479 | 10/1957 | Buchmann | 200—61.27 |
| 3,171,911 | 3/1965 | Brown | 200—61.34 |
| 3,200,212 | 8/1965 | Barcus et al. | 200—61.34 |
| 1,839,034 | 12/1931 | Johnson | 200—1 |
| 2,605,367 | 7/1952 | Cochran | 200—166 |
| 2,798,915 | 7/1957 | Watson | 200—166 |
| 2,747,174 | 5/1956 | Hollins | 340—81 |

BERNARD A. GILHEANY, *Primary Examiner.*

G. HARRIS, *Assistant Examiner.*